US012084988B2

(12) United States Patent
Bellacci et al.

(10) Patent No.: US 12,084,988 B2
(45) Date of Patent: Sep. 10, 2024

(54) ROTOR BLADE ABRASIVE TIP FOR HOT GAS EXPANDER

(71) Applicant: NUOVO PIGNONE TECNOLOGIE—S.r.l., Florence (IT)

(72) Inventors: Michelangelo Bellacci, Florence (IT); Gianfranco Maffulli, Florence (IT); Lorenzo Cosi, Florence (IT); Nicola Ciarla, Florence (IT)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 124 days.

(21) Appl. No.: 17/593,226

(22) PCT Filed: Mar. 6, 2020

(86) PCT No.: PCT/EP2020/025116
§ 371 (c)(1),
(2) Date: Sep. 13, 2021

(87) PCT Pub. No.: WO2020/182349
PCT Pub. Date: Sep. 17, 2020

(65) Prior Publication Data

US 2022/0162950 A1 May 26, 2022

(30) Foreign Application Priority Data

Mar. 13, 2019 (IT) ........................ 102019000003691

(51) Int. Cl.
*F01D 5/28* (2006.01)
*C10G 11/18* (2006.01)
(Continued)

(52) U.S. Cl.
CPC .............. *F01D 5/288* (2013.01); *C10G 11/18* (2013.01); *C10G 75/00* (2013.01); *F01D 5/20* (2013.01); *F01D 11/122* (2013.01); *F05D 2220/62* (2013.01); *F05D 2230/90* (2013.01); *F05D 2240/307* (2013.01); *F05D 2300/6111* (2013.01)

(58) Field of Classification Search
CPC ................................... F01D 5/288; F01D 5/20
See application file for complete search history.

(56) References Cited

U.S. PATENT DOCUMENTS 5,453,329 A * 9/1995 Everett ................. C23C 24/103 428/565
5,551,840 A 9/1996 Benoit et al.
(Continued)

FOREIGN PATENT DOCUMENTS

EP 0166676 A2 1/1986
EP 0484115 A1 5/1992
(Continued)

OTHER PUBLICATIONS

Seno, Koichi, "The Development of Power Recovery System in a Flow Catalytic Cracking Device," Hitachi statement, Japan, vol. 62, No. 2, pp. 35-40 (1980), 1980.

*Primary Examiner* — Eldon T Brockman
(74) *Attorney, Agent, or Firm* — Paul Frank + Collins P.C.

(57) ABSTRACT

A blade for fluid catalytic cracking (FCC) flue hot gas expander with a layer of hard abrasive material localized on the blade tip that contributes to reducing the accumulation of FCC catalyst residuals in the expander.

7 Claims, 3 Drawing Sheets

(51) Int. Cl.

| | |
|---|---|
| ***C10G 75/00*** | (2006.01) |
| ***F01D 5/20*** | (2006.01) |
| ***F01D 11/12*** | (2006.01) |

(56) References Cited

U.S. PATENT DOCUMENTS

| | | | | | |
|---|---|---|---|---|---|
| 5,672,047 | A | 9/1997 | Birkholz | | |
| 5,952,110 | A * | 9/1999 | Schell | F01D 11/12 | 427/427 |
| 6,190,124 | B1 * | 2/2001 | Freling | C23C 28/3215 | 415/174.4 |
| 6,194,086 | B1 * | 2/2001 | Nenov | C23C 28/00 | 428/678 |
| 6,544,665 | B2 * | 4/2003 | Rigney | C23C 28/321 | 428/338 |
| 7,510,370 | B2 * | 3/2009 | Strangman | C23C 26/02 | 415/174.4 |
| 7,666,516 | B2 * | 2/2010 | Nazmy | C23C 28/3215 | 416/241 B |
| 2008/0166225 | A1 * | 7/2008 | Strangman | F01D 11/122 | 415/173.4 |
| 2008/0241560 | A1 * | 10/2008 | Nazmy | C23C 30/00 | 427/454 |
| 2012/0251777 | A1 * | 10/2012 | Duval | C22C 47/06 | 428/221 |
| 2017/0218770 | A1 * | 8/2017 | Griffin | F01D 5/082 | |

FOREIGN PATENT DOCUMENTS

| | | | |
|---|---|---|---|
| EP | 0573928 | A1 | 12/1993 |
| EP | 1042541 | A1 | 10/2000 |
| JP | 04-285198 | | 10/1992 |
| WO | 2008135803 | A1 | 11/2008 |

* cited by examiner

ROTOR BLADE ABRASIVE TIP FOR HOT GAS EXPANDER

TECHNICAL FIELD

The subject-matter disclosed herein relates generally to a rotor blade suitable for use in a fluid catalytic cracking (FCC) flue hot gas expander. The rotor blade comprises an abrasive tip and contributes to reducing the accumulation of FCC catalyst residuals in the expander. Also disclosed herein is a method for producing said blade, a hot gas expander comprising said blade and a method for recovering power from FCC flue gas wherein the FCC flue is fed into said hot gas expander.

BACKGROUND ART

Fluid catalytic cracking (FCC) is one of the most important conversion processes used in petroleum refineries. It is widely used to convert the high-boiling, high-molecular weight hydrocarbon fractions of petroleum crude oils into more valuable gasoline, lower alkene gases, and other products.

In the overall efforts of oil refiners of improving utility consumption and reducing stack emissions, recovery of power from the FCC flue gas, i.e. the flow of gas exiting the FCC plants, is receiving particular attention, especially since this power source is "clean" in that no additional $CO_2$ is produced or emitted.

While much work has been done over the past 40 years to improve the reliability and operability of FCC flue gas power recovery systems, the process has remained largely unchanged. Traditionally, the FCC flue gas power recovery system has all too often been treated as an "accessory", tacked on only to higher capacity, higher pressure FCC units in areas of high electrical cost. However, in recent years, some innovative improvements have been developed, especially in the way power recovery systems are incorporated into the FCC unit. These innovations significantly reduce the capital cost per unit of energy recovered from FCC unit flue gas in an environmentally friendly manner. These innovations can potentially double the ROI (energy recovery profit) for a power recovery system when compared to traditional installations. This has greatly increased the application range of power recovery systems to FCC capacities for which it was previously considered uneconomical.

In the most common design of an apparatus for FCC flue energy recovery, an hot gas expander is present, which is fed with flue gas deriving from the FCC unit and is coupled to a main air blower, proving a direct transfer of energy to a shaft. Unlike the rotating blades systems which are present in gas turbine engines, the formation of a tight dynamic seal between the rotating blade and the surrounding casing during operation is not needed. In fact, contact between the blade tips and the internal surface of the FCC flue hot gas expander shroud should be avoided, to minimize wear of the blades and loss of efficiency. The internal surface of the FCC flue hot gas expander casing surrounding the rotor, hence, is not coated with an abradable material.

One main and still unmet problem of FCC flue energy recovery, however, is accumulation of residual catalyst, carried by the flue gas stream arriving from the FCC unit, on some components of the hot gas expander. The catalyst and other solid or semi-solid residuals stick on the shroud of the gas expander to form a layer of solid material which may come into contact with the tips of the rotor blades. Contact between the blade tips and said layer causes erosion of the blade tips, causing a loss of geometry, hence of energy recovery efficiency, and fatigue effect on the blades, which can fail, affecting the reliability of the expander and of the whole plant.

Repairs to the worn blades are impractical and frequent stops of the plant may be needed to replace the worn parts, with loss of productivity and economical drawbacks.

SUMMARY

In one aspect, the subject-matter disclosed herein is directed to a blade suitable for use in a fluid catalytic cracking (FCC) flue hot gas expander with a layer of hard abrasive material localized on the blade tip to remove residuals of solid materials, such as catalyst and process by-products, which may accumulate inside the expander shroud using the grinding effect of hard particles.

While the expander is functioning, the abrasive layer materials located on the rotor blades tips grind continuously the initial accumulation of FCC on the shroud and avoid the growth of a catalyst layer on the internal surface of the shroud, so that improved performances and reliability of the hot gas expander are achieved.

In another aspect, the subject-matter disclosed herein relates to a hot gas expander for managing fluid catalytic cracking (FCC) flues, wherein the internal surface of the hot gas expander shroud is not coated with an abradable material, which comprises at least a rotor blade having a body and bearing an abrasive material, different from the material of the body, on the tip of blade, wherein said abrasive material is composed of hard abrasive particles embedded in a metallic matrix or in an oxidant-resistant matrix and the thickness of the abrasive material layer is from 0.5 to 5 mm.

In another aspect, the subject-matter disclosed herein relates to the use of said hot air expander as a component of an FCC plant to recover energy from the FCC hot gas flue with improved overall efficiency.

BRIEF DESCRIPTION OF THE DRAWINGS

A more complete appreciation of the herewith disclosed embodiments and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
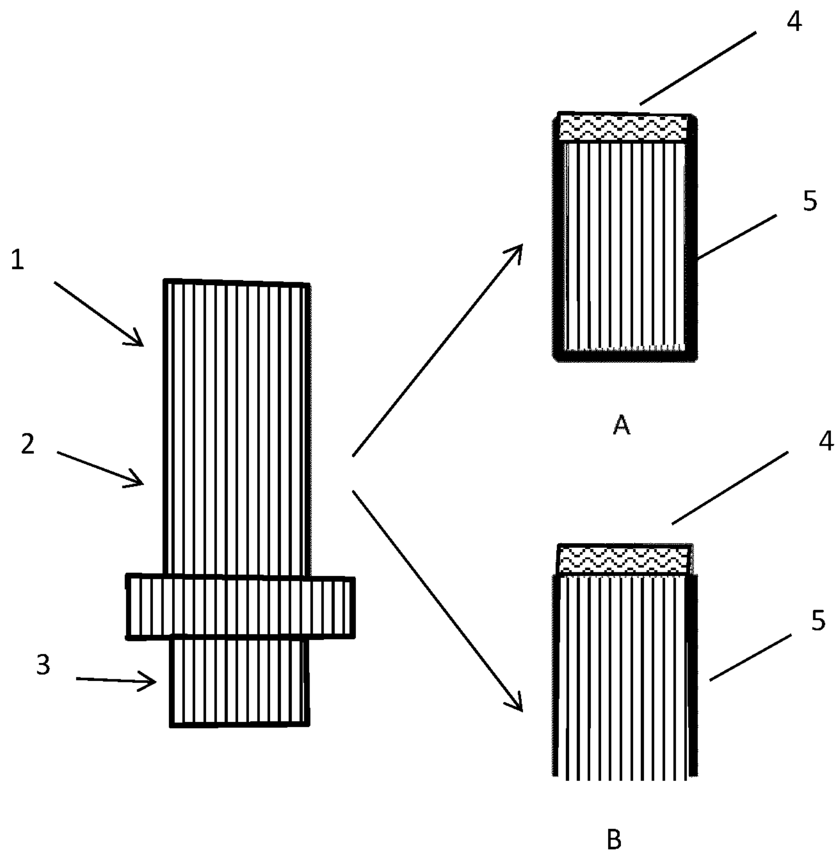
FIG. 1 shows the profiles of rotor blades according to the present disclosure, wherein 1 is the foil, 2 is the platform and 3 is the foot of the rotor blade. In rotor blade B, the abrasive tip 4 was deposited before the application of an anti-erosion coating 5. In rotor blade A, the abrasive tip 4 was applied after the application of an anti-erosion coating 5 on the airfoil.
Figure 2:
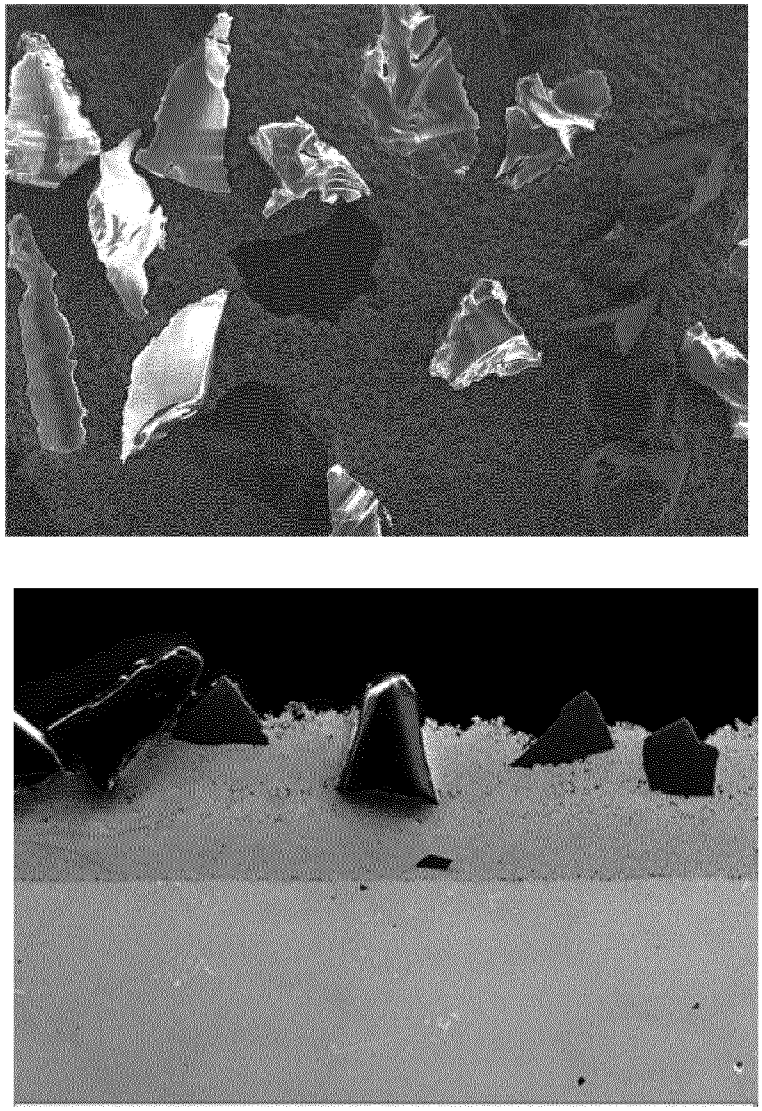
FIG. 2 shows microscopy images of typical abrasive coating material, cBN/oxides mixture grits in NiCoCrAlY matrix, applied on the blade in top view (above) and in profile (below) showing the zone of adhesion between the abrasive (mid part of the picture) and the foil (bottom of the picture).
Figure 3:
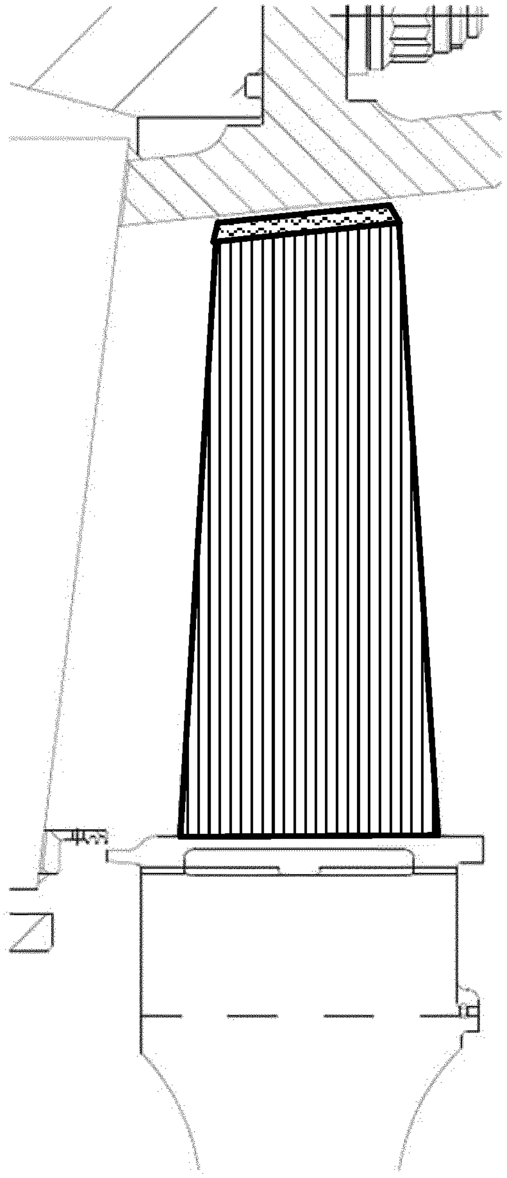
FIG. 3 shows a non-limiting example of a portion of the hot gas expander (part of the shroud and tip of the blade) as disclosed herein.

According to one aspect, the present disclosure relates to a rotor blade suitable for use in a fluid catalytic cracking (FCC) flue hot gas expander having a body and bearing an abrasive material, different from the material of the body, on the tip of blade, wherein said abrasive material is composed of hard abrasive particles embedded in a metallic matrix or in an oxidant-resistant matrix and the thickness of the abrasive material layer is from 1 to 5 mm.

The advantages are numerous and include the fact that the blade disclosed herein grinds, and substantially eliminates, the initial accumulation of solid residuals, e.g. deriving from the fluid cracking catalyst, which tends to form inside the shroud of the expander. The herewith disclosed blade limits, or substantially eliminates, the detrimental effects of catalyst accumulation in the FCC hot gas expander, which include, but are not limited to, blade consumption, fatigue problems on the blades and damage to other components due to large catalyst particles detachment as consequence of rotor blades hits.

The blade with abrasive tip according to the present disclosure minimizes, or practically suppresses, the detrimental effects on performance and reliability of the hot gas expander, due to consumption/structural failure of the blades due to impact of the tips with catalysts residual which accumulate inside the shroud. Such impacts lower the performances, since they cause random variations of the gap between shroud and rotor blade and unpredictable variation of blade geometry and fluidodynamics.

The impact of the blade tips against the solid catalyst residuals also has detrimental effects on reliability, due to variation of blade section and blade fatigue cracking phenomena due to the hits. Furthermore, the solid particles of catalyst encrustation, which are detached upon hit by the conventional blades may hit and damage other components of the expander and of the plant.

Without being bound by theory, the continuous grinding of catalyst residuals shortly after they are deposited on the shroud prevents the formation of a hardened solid encrustation, which would be more difficult to remove and which may cause damage to the blades and to other parts of the plant. The achievement of the present disclosure in terms of performance is also linked to the fact that the original gap between shroud and blade tip is maintained, avoiding catalyst accumulation.

In a preferred embodiment, in the blade as disclosed herein the hard abrasive particles comprise at least one material selected from polycrystalline cubic boron nitride (CBN, CAS number 10043-11-5), chromium carbide, preferably $Cr_3C_2$ (CAS number 12012-35-0), aluminum oxide ($Al_2O_3$, CAS number 1344-28-1), silicon oxide ($SiO_2$, CAS number 7631-86-9), zirconia oxide ($ZrO_2$), hafnia oxide ($HfO_2$) and mixtures thereof.

In a preferred embodiment, in the blade as disclosed herein the metallic matrix of the abrasive material is selected from nickel or cobalt alloy (for example nickel superalloy+NiCrSi in case of sintered tape brazed to the blade) or MCrAlY wherein M stands for nickel, cobalt and/or another metal (for example CoNiCrAlY) or mixtures thereof and/or the body of the blade is made of nickel or cobalt base alloy (for example IN738) or the oxidant-resistant matrix of the abrasive material is selected from ceramic layers, silicide brazes or MCrAlY wherein M stands for nickel, cobalt and/or another metal or mixtures thereof and/or the body of the blade is made of nickel or cobalt base alloy.

In a preferred embodiment, in blade according to the present disclosure, the initial thickness of the abrasive material layer is from 1.5 to 4 mm, preferably from 2 to 3 mm.

In a preferred embodiment, in the blade according to the present disclosure, the amount of the hard abrasive particles in the abrasive material on said blade is from 20 to 80%, preferably from 30 to 70% or from 40 to 50% in weight with respect to the overall weight of the abrasive material.

According to one aspect, the present disclosure relates to a process for producing the rotor blade as described above, wherein the abrasive material is attached to the body of the blade via a method selected from welding, cladding, coating (for example vacuum deposition, thermal spray, electrolytic) or brazing (for example brazing of tape made by sintering) with eventual diffusion heat treatment to increase adhesion to substrate.

According to one aspect, the present disclosure relates to a hot gas expander for managing fluid catalytic cracking (FCC) flues, wherein the internal surface of the hot gas expander shroud is not coated with an abradable material. which comprises at least a rotor blade having a body and bearing an abrasive material, different from the material of the body, on the tip of blade, wherein said abrasive material is composed of hard abrasive particles embedded in a metallic matrix or in an oxidant-resistant matrix and the thickness of the abrasive material layer is from 0.5 to 5 mm. In the hot gas expander for managing fluid catalytic cracking (FCC) flues according to the present disclosure, a dynamic seal is not formed between the blade tips and the inner casing i.e. in the absence of residuals from the FCC process the blade tips do not come into contact with the internal surface of the shroud. Preferably, the thickness of said abrasive material layer on the tip of the blade is from 1 to 4 mm, more preferably from 2 to 3 mm.

Preferably, in the hot gas expander for managing FCC flues according to the present invention the hard abrasive particles comprise at least one material selected from polycrystalline cubic boron nitride (CBN, CAS number 10043-11-5), chromium carbide, preferably $Cr_3C_2$ (CAS number 12012-35-0), aluminum oxide ($Al_2O_3$, CAS number 1344-28-1), silicon oxide ($SiO_2$, CAS number 7631-86-9), zirconia oxide ($ZrO_2$), hafnia oxide ($HfO_2$) and mixtures thereof.

In a preferred embodiment, in the blade of the hot gas expander for managing FCC flues according to the present invention the metallic matrix of the abrasive material is selected from nickel or cobalt alloy (for example nickel superalloy+NiCrSi in case of sintered tape brazed to the blade) or MCrAlY wherein M stands for nickel, cobalt and/or another metal (for example CoNiCrAlY) or mixtures thereof and/or the body of the blade is made of nickel or cobalt base alloy (for example IN738) or the oxidant-resistant matrix of the abrasive material is selected from ceramic layers, silicide brazes or MCrAlY wherein M stands for nickel, cobalt and/or another metal or mixtures thereof and/or the body of the blade is made of nickel or cobalt base alloy.

In a preferred embodiment, in the hot gas expander according to the present disclosure, the distance between the blade tips and the internal wall of the shroud is from 1 to 10 mm (depending on machine size) preferably from 3 to 7 mm, in the steady state during operation. In a preferred embodiment, the hot gas expander according to the present disclosure is not coated internally with an abradable material. In the context of the present disclosure, the term "abradable material" indicates a substance than can be consumed by contact with a harder material, so that a dynamic abradable materials in the context of the present disclosure are organic polymers, such as polyester, luminium silicon graphite powders, aluminium silicon hexagonal boron nitride, zirconium oxide ceramic abradable powders, ytterbia zirconate based ceramin abradable powders, CoNiCrAlY-BM/polyester powders, aluminium bronze/polyester abradable powders, nickel chromium alloy/boron nitride powders, nickel chromium aluminium/bentonite powder, nickel graphite or mixtures thereof.

According to one aspect, the present disclosure relates to a method for recovering power from FCC flue gas, wherein the flue gas, which is produced in a fluid catalytic cracking apparatus, is fed into the hot gas expander as disclosed above.

The hot gas expander as disclosed herewith allows to achieve higher performance and productivity of the FCC plant, also due to the decreased number of stops to due to repair and substitution of blades and other components, than the known expanders.

In a preferred embodiment, in the method disclosed herein the residuals of cracking catalyst are removed from the internal wall of the shroud by the abrasive tips of the blades, so as to maintain an optimal distance from the tips of the blades and the inner surface of the shroud and to minimize damage of the blades and of other components of the plant.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Unless otherwise indicated, within the context of the present disclosure the percentage quantities of a component in a mixture are to be referred to the weight of this component in grams with respect to the total weight of the mixture.

Unless otherwise specified, within the context of the present disclosure the indication that a composition "comprises" one or more components or substances means that other components or substances may be present in addition to that, or those, specifically indicated.

Unless otherwise specified, within the scope of the present disclosure, a range of values indicated for an amount, for example the weight content of a component, includes the lower limit and the upper limit of the range. For example, if the weight or volume content of a component A is referred to as "from X to Y", where X and Y are numerical values, A can be X or Y or any of the intermediate values.

Reference now will be made in detail to embodiments of the disclosure, one example of which is reported in the figures. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

What is claimed is:

1. A hot gas expander for managing fluid catalytic cracking (FCC) flues, the hot gas expander comprising:

a hot gas expander shroud having an internal surface that is not coated with an abradable material; and a rotor blade comprising:

a body, a blade tip spaced apart from the internal surface of the hot gas expander shroud, forming a gap, the blade tip having outside edges and comprising an abrasive material layer disposed on the rotor blade, the abrasive material layer comprising hard abrasive particles embedded in ceramic layers that are different from material of the body, and an anti-erosion coating disposed on the body and the blade tip and covering the outside edges of the abrasive tip, wherein the abrasive material layer has a thickness from 0.5 to 5 mm, and wherein the abrasive blade tip is configured to grind catalyst residuals found on the internal surface of the shroud to maintain the gap during operation of the FCC flue hot gas expander.

2. The rotor blade of claim 1, wherein hard abrasive particles comprise at least one material selected from polycrystalline cubic boron nitride (CBN), chromium carbide ($Cr3C2$), aluminum oxide ($AhO3$), silicon oxide ($SiO2$), zirconia oxide ($ZrO2$), hafnia oxide ($HfO2$) and mixtures thereof.

3. The rotor blade of claim 1, wherein the thickness of the abrasive material layer is 1.5 to 4 mm.

4. The rotor blade of claim 1, wherein the amount of the hard abrasive particles in the abrasive material is from 20 to 80% in weight with respect to the overall weight of the abrasive material.

5. The hot gas expander according to claim 1, wherein the gap between the blade tip and the internal surface of the hot gas expander shroud is from 1 to 10 mm in the steady state during operation.

6. A method for recovering power from FCC flue gas, wherein the flue gas, which is produced in a fluid catalytic cracking apparatus, is fed into the hot gas expander according to claim 1.

7. The method according to claim 6, wherein residuals of cracking catalyst are removed from the internal wall of the shroud by the abrasive tips of the blades, so as to maintain an optimal distance from the tips of the blades and the inner surf ace of the shroud and to minimize damage of the blades and of other components of the plant.

* * * * *